Oct. 3, 1933.    W. G. MIDNIGHT    1,929,282
AUTOMATIC CONTROL FOR ABSORPTION REFRIGERATORS
Filed March 7, 1932    6 Sheets-Sheet 6
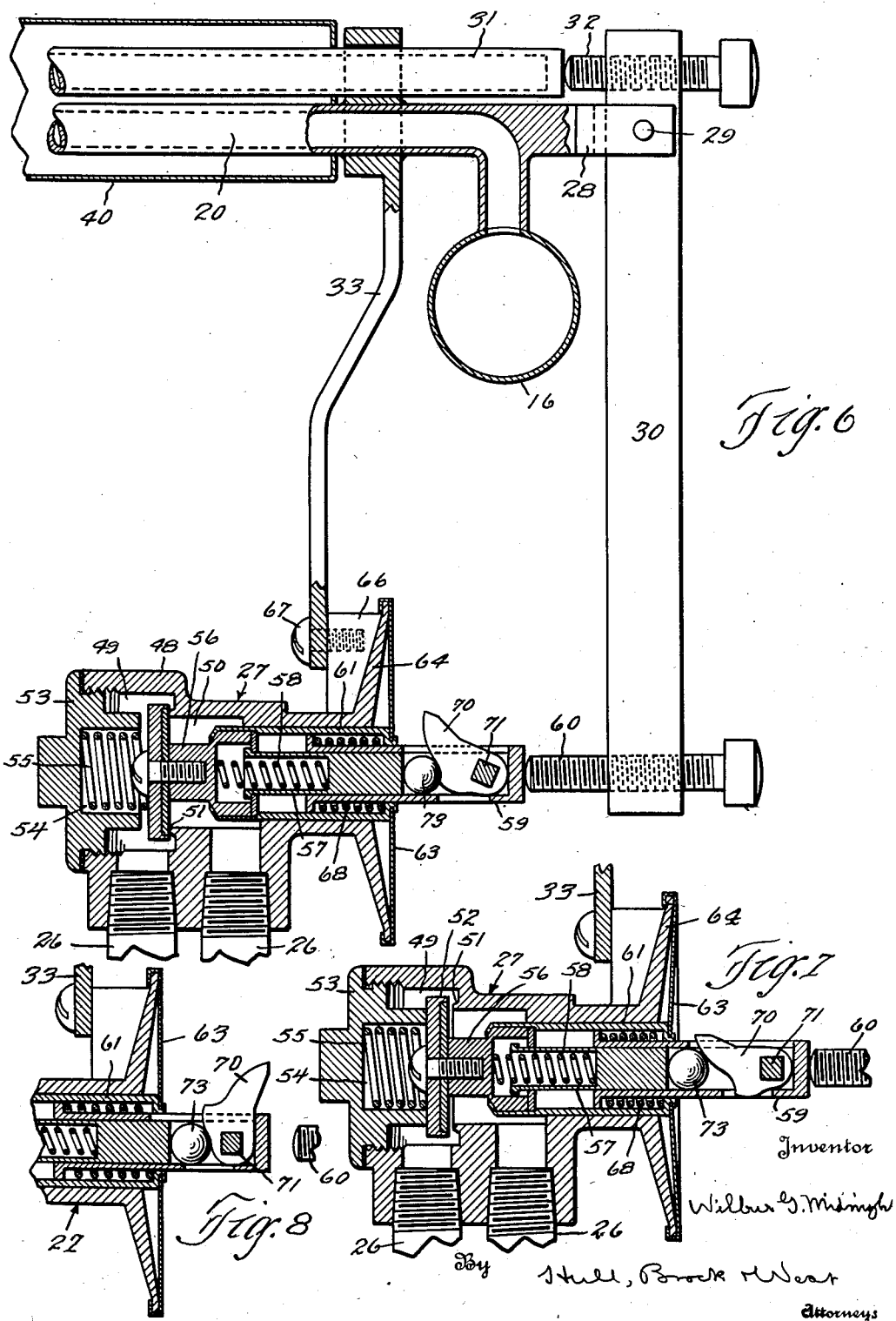

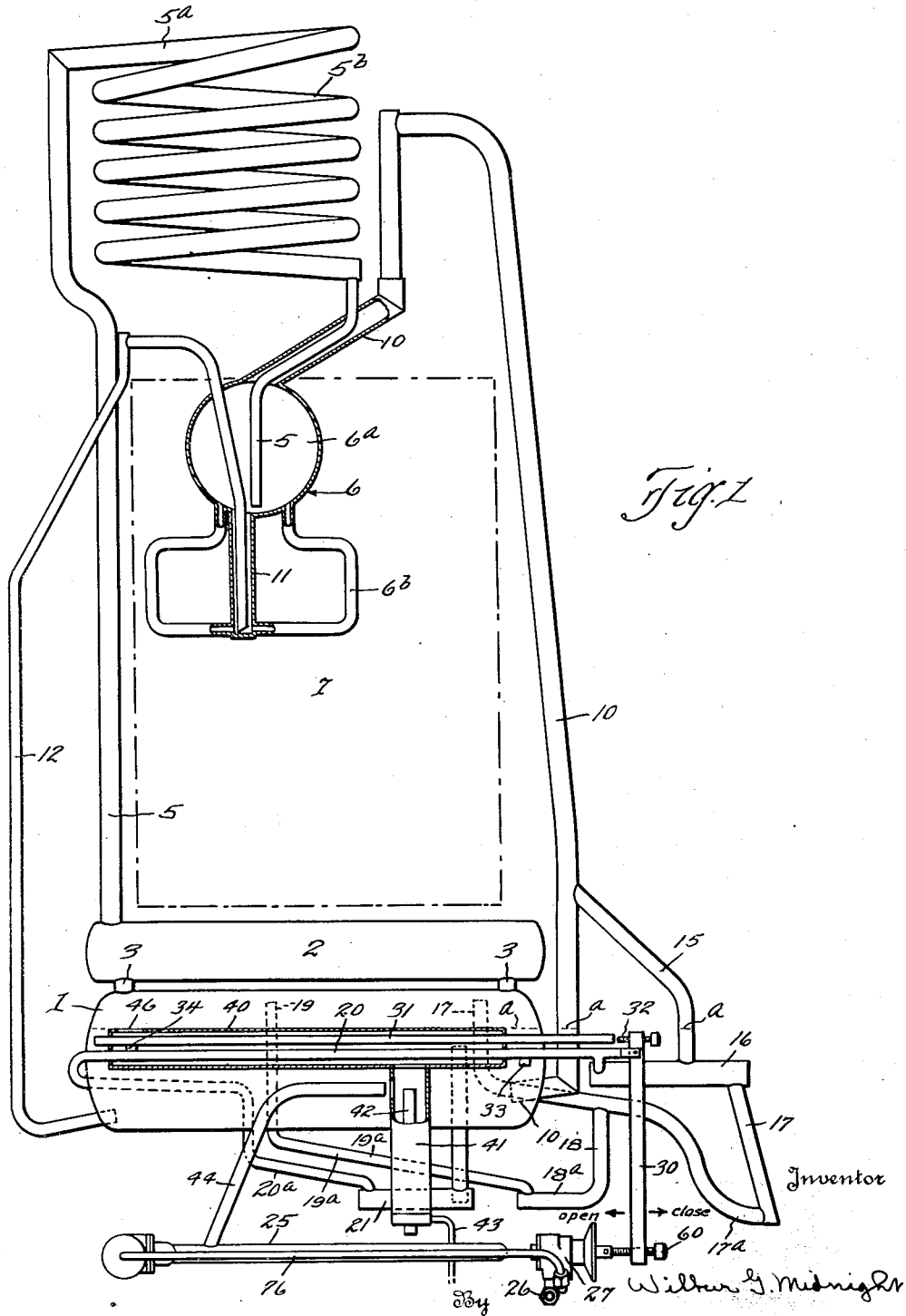

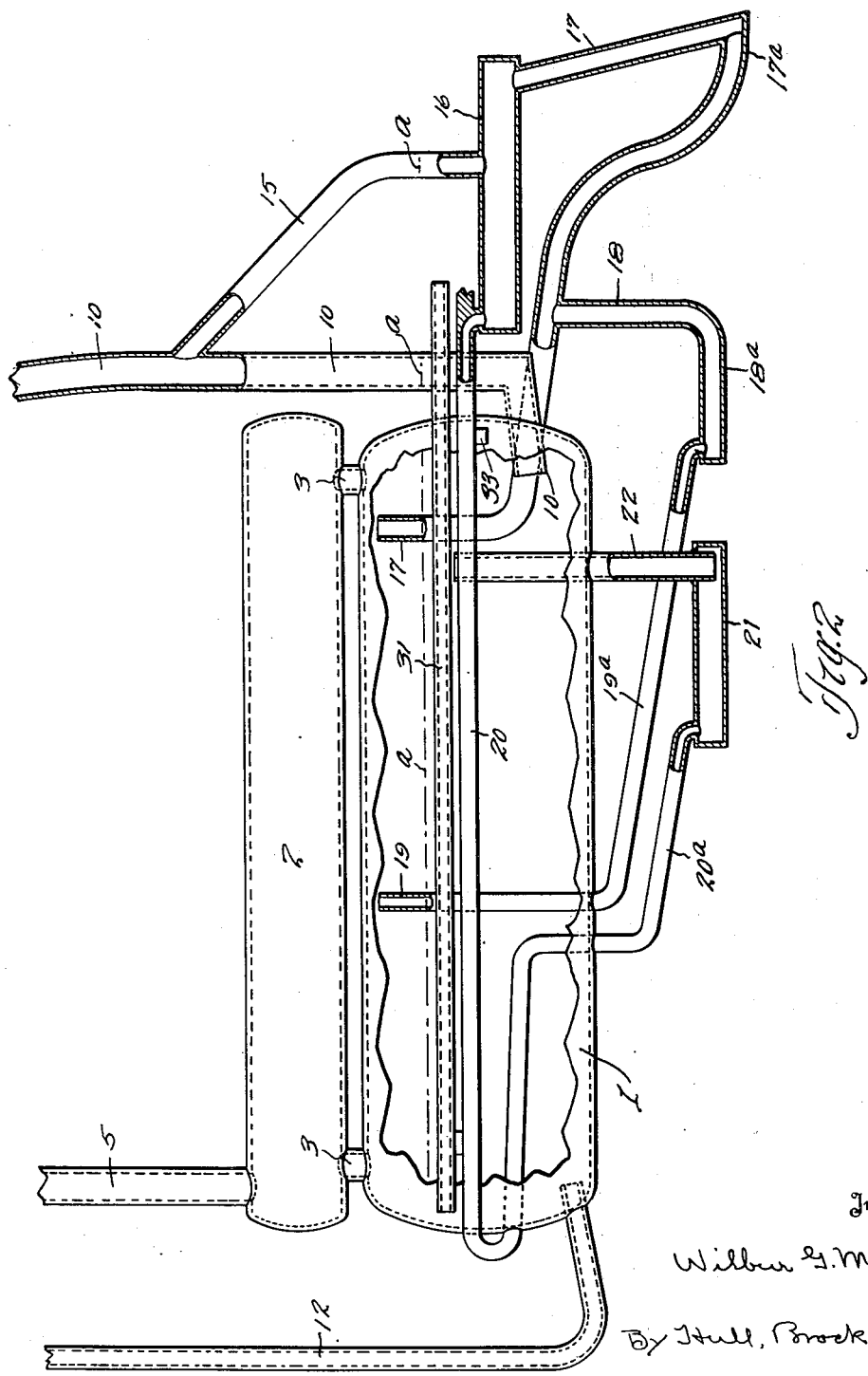

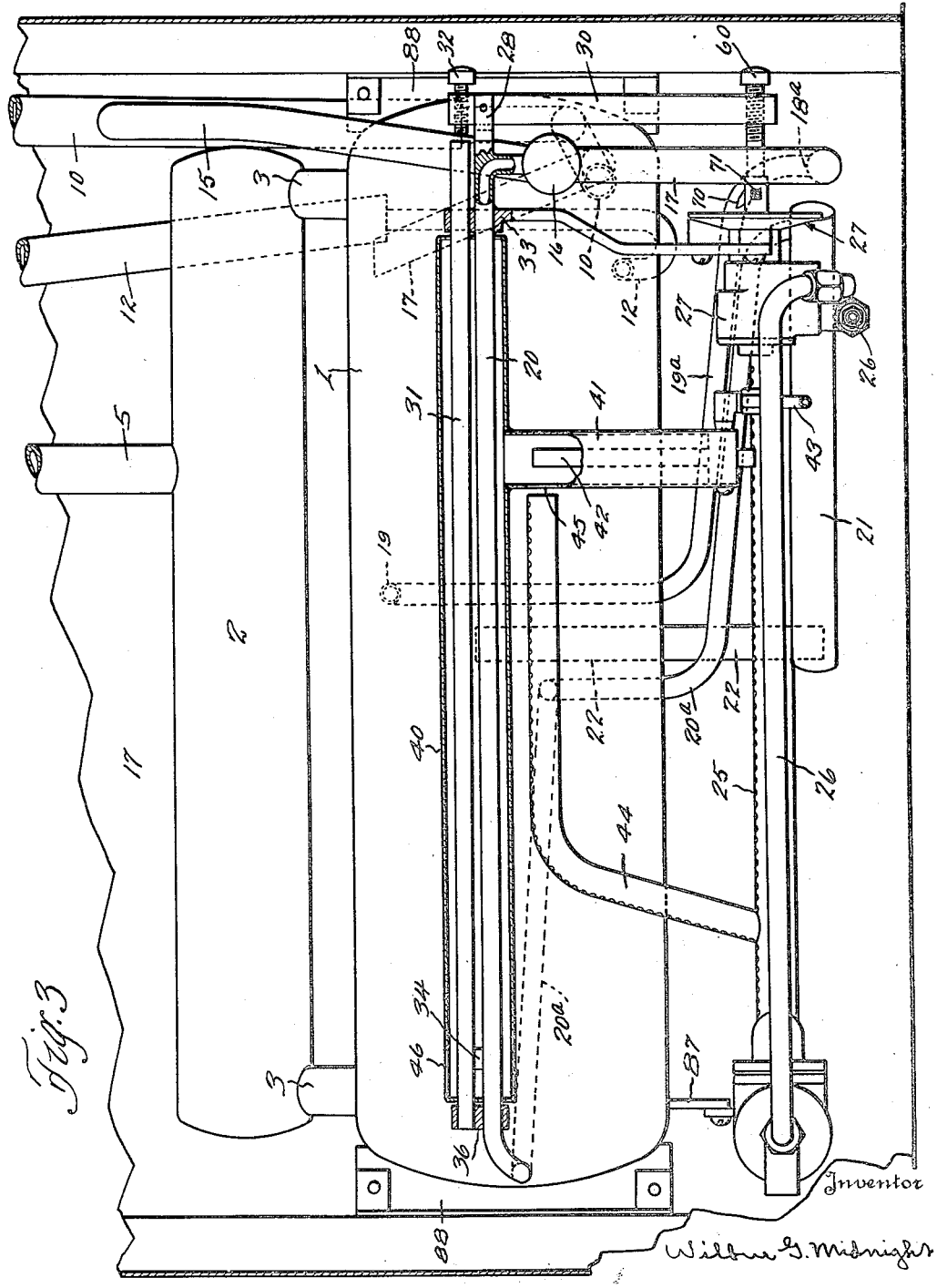

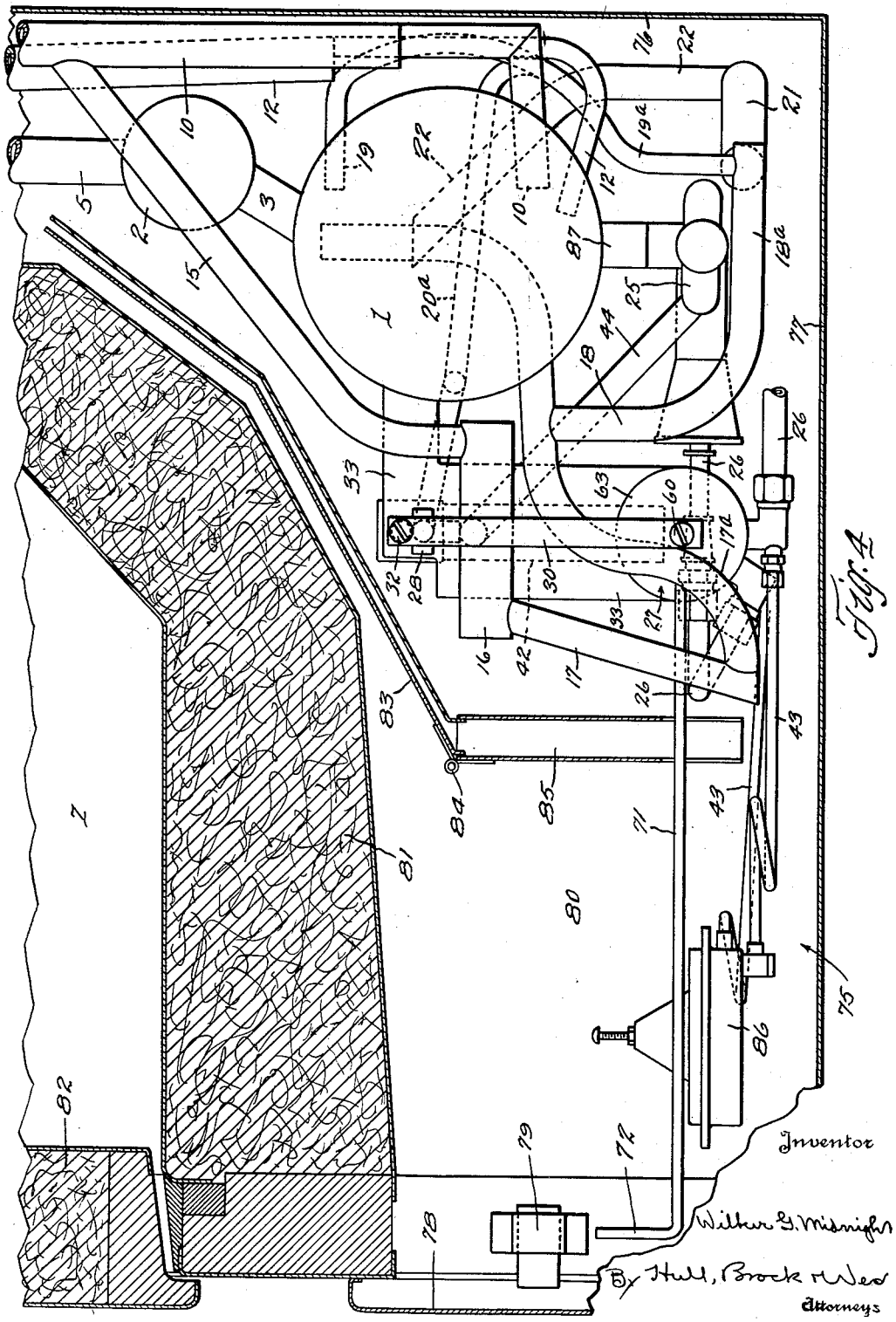

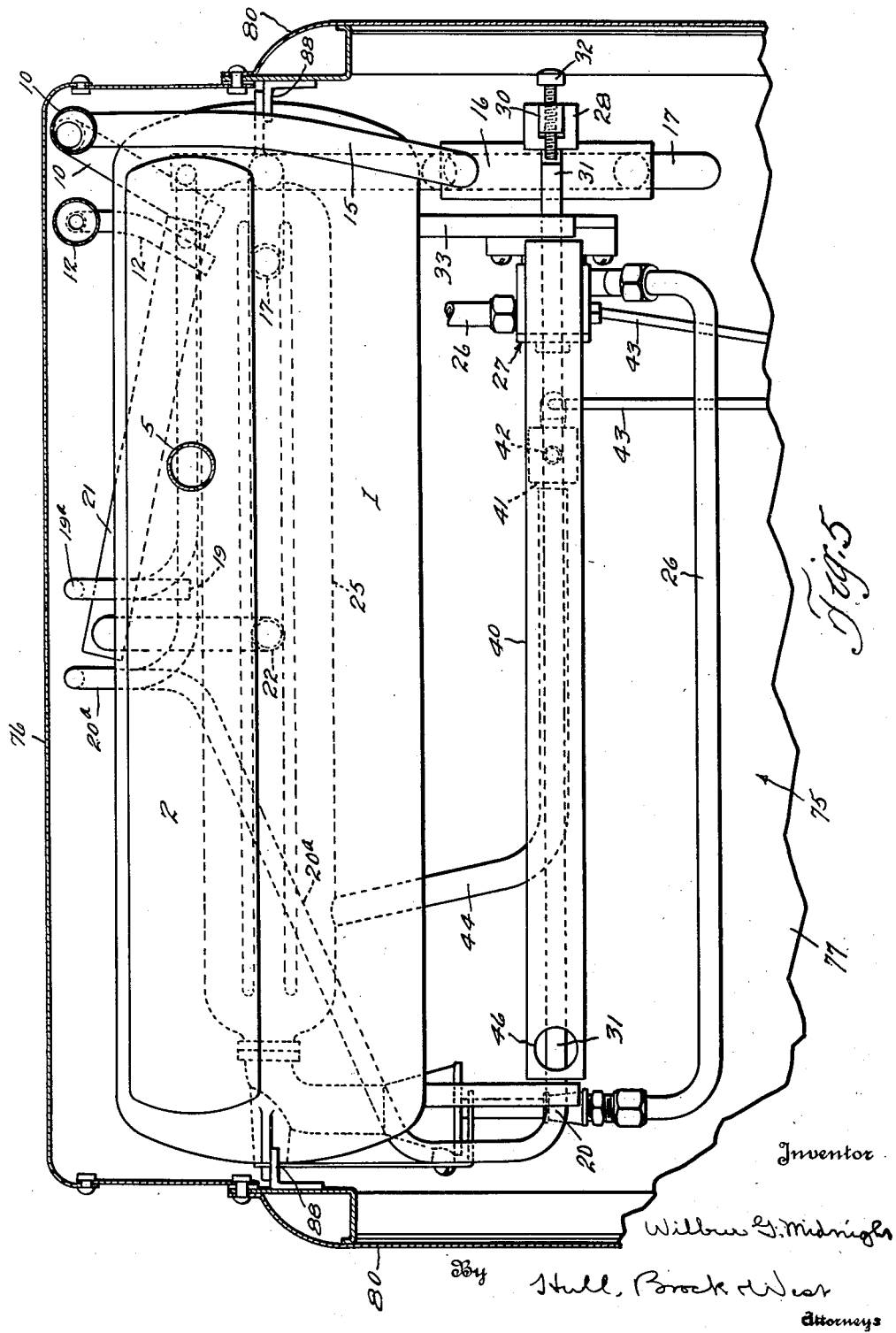

Patented Oct. 3, 1933

1,929,282

UNITED STATES PATENT OFFICE 1,929,282

AUTOMATIC CONTROL FOR ABSORPTION REFRIGERATORS

Wilbur G. Midnight, Cleveland, Ohio, assignor to Perfection Stove Company, Cleveland, Ohio, a corporation of Ohio Application March 7, 1932. Serial No. 597,205

40 Claims. (Cl. 62—5)

This invention pertains to refrigeration apparatus of the intermittent absorption class, and it consists of an automatic control therefor.

The primary object of the invention is to provide relatively simple yet highly efficient and reliable means for automatically controlling the operation of intermittent absorption refrigeration apparatus, which means is caused to function to initiate the heating-condensing phase of a cycle of operation upon the attainment of a predetermined low liquid level in the evaporator end of the system, and which is caused to function to inaugurate the cooling-absorption period upon the attainment of a predetermined low liquid level in the generator-absorber end of the system. Stated otherwise with regard to one of the foregoing instances, the means is caused to function by a pressure condition brought about by the attainment of a certain liquid level in the evaporator end of the system.

The invention is especially applicable to gas-fired refrigeration apparatus of the intermittent absorption class, and another object is to provide a safety feature by making the operativeness of the automatic control means dependent on the heat of the pilot light that is employed for igniting the main burner, thus insuring against the gas supply to the main burner being turned on in case the pilot light has become extinguished from any cause.

Looking toward absolute safety, a further and very important aim of my present invention is to provide a thermostatically controlled intermittent absorption refrigeration apparatus that is heated by means of a fluid fuel combustion device equipped with an igniter and in which the fuel supply to the combustion device is shut off in case the igniter fails to light the combustion device.

A further object comprehended by the invention is the provision of manual means, of simple construction, by which the automatic control may be conveniently rendered ineffective, as when it is desired to shut down the system for de-frosting purposes; or by which the system may be readily set in operation after having been shut down for a protracted period.

The foregoing objects, with others that will appear during the following detailed description, are attained in the embodiment of the invention illustrated in the accompanying drawings wherein Fig. 1 is a diagrammatic representation of a refrigeration system of the intermittent absorption class incorporating the invention; Fig. 2 is a similar view of the lower portion of the system on a scale considerably enlarged over that of Fig. 1 and wherein some of the parts are shown in section, the side of the generator-absorber is broken away, and from which the gas burner, pilot light, and parts associated therewith are omitted; Fig. 3 is a sectional front elevation of the lower portion of a refrigerating machine constructed in accordance with the invention; Fig. 4 is a fragmentary sectional side elevation, and Fig. 5 a similar plan view, of the same; Fig. 6 is a sectional detail of the valve for controlling the supply of gas to the main burner, and a part of the thermostatic means for controlling the valve, with the operative connections between the two included; Fig. 7 is a similar view of the valve, showing it held open by manually operated means, and Fig. 8 is a further detail of a part of the valve, showing it so conditioned as not to be operable by the thermostatic means.

Describing the parts by reference characters, 1 designates the generator-absorber, which is in the nature of an elongated cylindrical vessel, and 2 is a vapor dome communicatively connected with the top portion of the generator-absorber by tubular risers 3. Extending upwardly from the dome 2 is a vapor delivery conduit 5. As shown in Fig. 1, this conduit ultimately leads to a receiver-evaporator designated generally by the reference numeral 6, the same consisting of a receiver $6^a$ and a cooling coil $6^b$ that communicates with said receiver and is located immediately below the same in heat exchanging relation to the interior of a refrigeration chamber 7 that is defined in Fig. 1 by dot-and-dash lines. The discharge end of the vapor delivery conduit is, in the present embodiment, of relatively small diameter and terminates adjacent the bottom of the receiver $6^a$. Adjacent the top of the apparatus the vapor delivery conduit is extended laterally and is inclined upwardly to provide a dehydrator designated $5^a$, and therebeyond the conduit is formed to provide a condenser coil $5^b$ from the lower end of which the portion of the conduit of lesser diameter extends.

A gas return conduit 10 leads from the upper portion of the receiver $6^a$ and after ascending to the region of the upper end of the apparatus is directed downwardly and into the generator-absorber 1 below the minimum liquid level therein. A tubular column 11 opens into and depends from the bottom portion of the receiver $6^a$ and communicates at its lower end with the coil $6^b$; and within the lower portion of this column and the adjacent part of the coil is adapted to accumulate any absorbent liquid that is left in the receiver-evaporator end of the system at the conclusion of a cooling period, it being understood by those acquainted with this class of apparatus that it is practically impossible to remove all of the absorbent vapors from the refrigerant vapors as the latter are delivered from the generator-absorber to the receiver-evaporator during the heating period. The greater part of the absorbent vapors is, of course, condensed within the conduit 5 between the dome 2 and the point of communication between the dehydrator 5ª and the condenser coil 5ᵇ, the most of the condensation taking place in the dehydrator. Such absorbent vapors as escape the dehydrator are condensed and flow with the refrigerant condensate into the receiver-evaporator, accumulating as above explained in the lower portion of the column 11 and coil 6ᵇ. A liquid return tube 12 extends upwardly through the column 11 from the lower end thereof and through the receiver 6ª from where it continues upwardly and laterally into close proximity to a portion of the vapor delivery conduit 5 and thence downwardly and into the lower portion of the generator-absorber 1. While this constitutes no part of the present invention, its mode of operation will be briefly explained hereinafter.

Extending laterally and downwardly from a point in the gas return conduit 10 a suitable distance above its discharge end is a branch conduit 15 that opens at its lower end into a receptacle 16. A tube 17 leads downwardly from one end of the receptacle 16 and thence upwardly and finally into the generator-absorber 1, entering the same near the bottom thereof but terminating within the top portion of the generator-absorber vessel. The lower part of this tube forms a trap that is designated generally by the reference character 17ª. Branching off from the tube 17, a material distance above the bottom of the trap 17ª is a tube 18 which extends downwardly and laterally to form a trap designated 18ª, the outlet of the trap being provided by a tube 19 that is inclined gradually upwardly and enters the generator-absorber 1, terminating therein at about the elevation of the upper end of the tube 17. Leading from the receptacle 16 is another tube 20 that is shown as extending along the front of the generator-absorber in parallel, spaced relation thereto, and near the end of the generator-absorber remote from the receptacle 16 said tube is turned rearwardly and enters said vessel but does not communicate with the interior thereof. It passes out through the wall of the vessel in the region of the central portion thereof and is then inclined gradually downwardly and enters a receptacle 21. A stand pipe 22 rises from the receptacle 21 and passes through the wall of the generator-absorber and terminates a suitable distance below the maximum liquid level therein or at approximately the minimum liquid level, as will more fully appear hereinafter. The inclined portions of the tubes 19 and 20 are, for convenience, designated 19ª and 20ª, respectively, and said inclined portions are arranged in heat receiving relation to a gas burner 25, this being the main burner that supplies heat to the generator-absorber.

The burner 25 receives its supply of gas from a suitable source through a pipe 26 that contains a valve designated generally by the reference numeral 27 and illustrated in detail in Figs. 6, 7 and 8. Connected to the tube 20, adjacent its point of communication with the receptacle 16, is a bracket 28 to which is pivoted, at 29, a lever 30. The lower end of the lever is disposed in operative relation to the valve and through suitable means, presently to be described, opens the valve when it is swung in the direction thereof, and permits the valve to close when swung in the opposite direction, as indicated by the words "open" and "close" and the arrows associated therewith, in Fig. 1.

The upper end of the lever 30 is disposed in operative relation to a thermostatic element or tube 31. For the sake of adjustment, the operative connections between the element or tube and lever is effected through the medium of a screw 32 that is threaded through the upper end of the lever and abuts the closed end of said tube.

The tube 31 extends parallel to and above the straight portion of the tube 20, between the latter's connection with the receptacle 16 and the point at which it enters the generator-absorber. These two tubes, jointly, constitute the thermostat by means of which the valve 27 is controlled. The upper tube 31 is empty, while the lower tube 20 contains liquid during certain phases of the operation of the apparatus. Therefore, for convenience of description, the upper tube 31 may be referred to as the dry tube and the aforesaid straight portion of the lower tube 20 as the wet tube of the thermostat. The wet tube 20 is anchored at a point designated 33 adjacent one end of the generator-absorber, and near the opposite end of said vessel the tubes are connected together in fixed relation at a point designated 34. In the structural views, which are all figures excepting numbers 1 and 2, 33 designates a bracket that extends laterally from the generator-absorber and to which the wet tube 20 is anchored and which provides a guide for the dry tube 31. The bracket 33 also supports the valve 27. The ends of the tubes 20 and 31 opposite the bracket 33 are guided within a bracket 36 that is carried by and extends laterally from the generator-absorber.

A heat conducting or confining flue or casing 40 surrounds the tubes 20 and 31 between the brackets 33 and 36, and communicating with the same and depending therefrom is a housing 41 that contains a so-called "pilot light" or burner 42 that receives its gas supply through a pipe 43. In accordance with prevailing practice, a perforated lighting tube 44 leads from the main burner 25 to an opening 45 in the housing 41 adjacent the pilot light, and when the main burner is turned on the gas will be communicated to the flame of the pilot burner by means of the tube 44 and upon being ignited will flash back along the row of perforations of the lighting tube and light the main burner. For a reason presently to be explained the lighting tube 44 extends for a substantial portion of its length directly beneath the casing 40 so as to impart heat thereto during the time the main burner is in operation. In order to create a draft through the flue or casing 40, the top wall of the latter is provided with an opening 46 at its end farthest from the pilot light.

As will be seen by reference to Figs. 6 and 7, the valve 27 comprises a casing 48 that contains what may be termed inlet and outlet compartments 49 and 50 between which is a valve seat 51 that is arranged to be engaged by a valve disk or body 52. The inlet compartment 49 opens through the end of the casing and is closed by a screw plug 53 having a recess 54 that houses a spring 55 which tends to urge the valve disk or body toward the seat 51. The said disk or body has a stem that is made up of telescoping sections 56 and 57 between which are interposed a relatively stiff spring 58. The outer end of the section 57 of the valve stem is slidable within a sleeve 59 that is shown as closed at its outer end for engagement by a projection on the lever 30, such projection being provided, preferably, by a screw 60 which permits of adjustment. The inner end of the sleeve 59 is flanged outwardly and is reciprocable within a tube 61 whose outer end is flanged inwardly to the diameter of the sleeve 59 and there has fluid-tight connection with a diaphragm 63 whose peripheral portion is likewise connected to the dished circular end 64 of the valve casing 48, the casing including a hollow boss within which the tube 61 is slidable. The valve casing is also formed with a part 66 for the reception of a screw 67 that connects said casing to the bracket 33. A spring 68 surrounds the inner end of the sleeve 59 and is compressed between the end flange thereof and the flange formed at the outer end of the tube 61. At its inner end, the tube 61 is rigidly connected to the inner section 56 of the telescopic valve stem.

The top and bottom walls of the outer ends of the sleeve 59 are slotted, and a cam 70 is disposed within the sleeve and is mounted on a square spindle 71 that is journaled in the opposed walls of the sleeve and extends forwardly and terminates in an operating handle 72 adjacent the front of the apparatus. A ball 73 is contained within the sleeve 59 and is interposed between the cam 70 and the outer section 57 of the telescopic valve stem. The normal position of the cam is illustrated in Fig. 6. It occupies this position when the operation of the apparatus is subjected to the automatic control means. The purpose of the cam will be presently explained.

Before proceeding with the description of the operation of the apparatus, it may be explained that the same includes a suitable cabinet, parts of which are shown in Figs. 3, 4 and 5. While the cabinet forms no part of the present invention, it may be pointed out that it is constructed to provide a compartment 75 adjacent the bottom of the apparatus which is enclosed by a rear wall 76, a bottom wall 77, a removable closure 78 at the front that is held in position by means designated 79 in Fig. 4, at the sides by walls 80, and at the top by the insulated or lagged wall 81 that separates the compartment 75 from the refrigeration chamber 7. The open front of this chamber is adapted to be closed by a door 82. To better shield the refrigeration chamber from the heat of the burner, generator, etc., a double-wall partition or baffle 83 is spaced a slight distance from the wall 81 throughout the region of the generator-absorber; and connected by a hinge 84 to the forward end of the baffle or partition 83 is a drop leaf 85 that is also of double wall construction. Thus an air passage is formed between the opposed walls of the drop leaf 85 and the baffle or partition 83, as well as between said partition or baffle and the lagged wall 81. The pipe 43 that supplies gas to the pilot light 42 cuts into the gas supply pipe 26, as shown in Fig. 4, and includes a pressure regulator 86 which may be of any approved type. The burner is shown as suspended from the generator-absorber by means designated 87, and the generator-absorber, in turn, is shown as supported by means designated 88 from the adjacent walls of the cabinet.

As is well understood, the refrigeration system is hermetically sealed and contains, in proper proportion, quantities of a refrigerant, such as ammonia, and a suitable absorbent therefor, such as water. At the beginning of a cycle of operation, all, or practically all, of the mixture is present in the generator-absorber 1, the liquid level therein at such time being indicated by the broken line $a$ in Figs. 1 and 2. Substantially the same liquid level prevails in the gas return conduit 10 and the branch 15 thereof, all tubes, and the receptacles 16 and 21, below said level being filled with liquid.

In describing the operation of the apparatus, it will be assumed that the pilot light 42 is burning and that the valve 27 has just been opened by the thermostatic means involving the wet and dry tubes 20 and 31, respectively, as a result of a condition that will presently be explained.

As previously pointed out, the inclined portions $19^a$ and $20^a$ of the respective tubes 19 and 20, as well as the generator-absorber 1, are subjected to the heat of the burner, and as a result the contents of the generator-absorber boils, and the liquid in the ascending portions of said tubes rises, that from the tube 19 spilling over into the generator-absorber, while that in the other tube travels upwardly and through the horizontal portion that constitutes the wet tube of the thermostat to the receptacle 16 from whence it descends through the tube 17 and then rises and overflows into the tube 18 again to replace the liquid that is being lifted into the generator-absorber by the heat. The tube 20 receives its liquid supply from the receptacle 21, and this receptacle, in turn, is supplied by overflow liquid from the generator-absorber through the stand pipe 22. Therefore, so long as the liquid level in the generator-absorber is above the upper end of said stand pipe, the circulation just described continues.

Proceeding now with the general description of the operation, the vapors pass from the generator-absorber through the tubular risers 3 into the dome 2 and thence to the conduit 5. While passing through the dehydrator portion $5^a$ thereof, most, if not all, of the absorbent vapors are condensed and returned by the conduit 5 to the dome 2 and finally to the generator-absorber through the risers 3. The refrigerant vapors, and such of the absorbent vapors as may pass the dehydrator portion $5^a$ of the vapor delivery conduit, pass through the condenser coil $5^b$ and are condensed therein and are finally delivered into the vessel $6^a$ of the receiver-evaporator 6. It will be understood, of course, that, according to the usual practice, the coil $5^b$ is submerged in a tank (not shown) of cooling liquid, such as water.

At the beginning of the heating period, which is here considered the beginning of the cycle of operation, and which is inaugurated by the ignition of the main burner, the pressure in the system rises with considerable rapidity and as a consequence thereof any absorbent liquid that has been left in the bottom of the receiver-evaporator—specifically, in the lower end of the column 11 and the adjacent portions of the coil $6^b$—is forced up the adjacent end of the liquid return tube 12 while liquid from the generator-absorber is also forced up the opposite end of said tube. The gas confined within the tube between the opposed bodies of liquid is rich in refrigerant and is absorbed by the relatively weak liquid, and these conditions will advance until substantially a continuous column of liquid is formed within the liquid return tube when a siphonic action occurs that draws over into the generator-absorber the liquid left in the bottom of the receiver-evaporator at the conclusion of the previous cooling period. The return of relatively pure refrigerant liquid is prevented by the fact that when such liquid reaches the warm zone where the liquid return tube is in intimate heat exchanging relation to the vapor delivery conduit 5, said liquid flashes into gas and prevents the continuation or promotion of the siphonic action.

The heating period continues until sufficient refrigerant has been distilled over from the generator-absorber into the receiver-evaporator to lower the level in the first mentioned vessel to substantially the elevation of the upper end of the stand pipe 22. Upon the receptacle 21 being thus deprived of overflow liquid from the generator-absorber, the liquid present in said receptacle and in the stand pipe 22 and tube 20 is gradually depleted by evaporation until the upper portion of the tube 20—that extending horizontally through the flue or casing 40 and previously referred to as the "wet tube"—becomes empty. As soon as this occurs its temperature rises and it expands and in so doing, by reason of its connection at 34 therewith, moves the dry tube 31 to the left, as the parts are viewed in Figs. 1, 3 and 6, for example. As a result of this retraction of the dry tube 31, the lever 30 is permitted to swing under the influence of the spring 55 and allow the valve disk or body 52 to be urged by said spring against the seat 51 and shut off the flow of gas to the main burner.

At this point it may be explained that the principal purpose of the dry tube 31 is to make the automatic control mechanism dependent for its operation upon heat from the pilot light. If the light is out, and tube 31 consequently not expanded or elongated, it will not transmit the motion of the tube 20 to the valve mechanism when the latter tube is contracted due to its being flooded by liquid from the generator-absorber occasioned by the breaking of the seal in the receiver-evaporator end of the system, as will presently appear.

Inasmuch as the temperature of the liquid in the generator-absorber end of the system becomes very high during the heating period and, because of its circulation through the wet tube 20 of the thermostat, the temperature of said tube is correspondingly raised, it is necessary to heat the dry tube 31, at least during this period, to substantially the temperature of the wet tube so as to maintain an operative relation between them. In order to accomplish this without having to use a constantly high pilot light with a consequential waste of fuel, I dispose the lighting tube 44 with a substantial portion of its length directly beneath the casing 40 so that the heat therefrom will augment that of the pilot light during the heating period to heat the dry tube 31 to the required degree.

The cooling or evaporating period begins when the main burner is turned off in the manner above described. The pressure within the system falls and the refrigerant liquid within the evaporator-receiver starts to evaporate and the refrigerant gas returns through the conduit 10 to the generator-absorber. On account of the evaporation of the refrigerant, a higher pressure prevails in the receiver-evaporator end of the system than in the generator-absorber end and this higher pressure is communicated through the gas return conduit and the branch 15 thereof to the receptacle 16 and tubes 20 and 17, keeping the upper portions of these tubes clear of liquid. Liquid is, of course, present in the traps 17ª and 18ª and in the receptacle 21, but in the absence of heat playing upon the portions 19ª and 20ª of the tubes 19 and 20, there is nothing to induce an upward flow of the liquid through said tubes.

Naturally the superior pressure in the receiver-evaporator end of the system will prevail as long as the evaporation continues and the discharge end of the vapor delivery conduit 5 is liquid sealed in the vessel 6ª. Just as soon, however, as the liquid level falls below the discharge end of said conduit 5, permitting the escape of gas through said conduit, the pressure in both ends of the system becomes equalized. It might be well to call attention at this point to the fact that during the cooling or evaporation period the returning gas, entering the generator-absorber 1 below the minimum liquid level therein through the discharge end of the gas return conduit 10, will be absorbed by the liquid in said vessel and the volume of liquid thus increased until the level has again attained the elevation indicated by the dot-and-dash line a. Now, when the pressure throughout the system becomes substantially the same, as above described, the relatively cool liquid from the generator-absorber will rush through the stand pipe 22 and the receptacle 21 to fill the tube 20, thus instantly reducing its temperature from the relatively high point at which it had been maintained when empty by the heat from the pilot light 42. Upon cooling, the horizontal portion of the tube 20 contracts and projects the dry tube 31 so as to rock the lever 30 in a direction to remove the valve disk or body 52 from the seat 51 against the tension of the spring 55, again opening up communication between the source of gas supply to the burner 25. As the gas issues from the burner it will be ignited by the pilot light through the intervention of the lighting tube 44, and another cycle of operation will thus be started.

It is evident from what has been said above that it is essential to the operation of the automatic control means that the pilot light be burning. This is for the two-fold purpose of expanding the dry tube 31 to its operative length and of heating the wet tube 20, after it had been emptied of its contents, so as to cause it to expand and retract the elongated dry tube 31 and allow the valve 27 to be closed by the action of its spring 55. All during the cooling-evaporating period the thermostatic tubes 20 and 31 are kept heated by the pilot light so as to permit the gas valve to remain closed, and it is not until the temperature of the wet tube 20 has been lowered (from that point at which it has been maintained by the pilot burner) due to the flooding of said tube by the relatively cool liquid from the generator, that the thermostat acts to open the valve of the gas burner. It follows, therefore, that the automatic control means of this invention is perfectly safe in that it prevents the turning on of the main burner excepting when the pilot light is burning. As a further measure of safety, it acts to turn off the gas in case the main burner fails to ignite, as, for example, by a stoppage in the lighting tube 44. Under these circumstances, the liquid in the wet tube of the thermostat is driven out by the formation of a gas pocket throughout the horizontal portion of said tube and the tube is heated and expanded to cause the shutting off of the gas.

It has already been said that the normal position of the cam 70 is that illustrated in Fig. 6.

Therefore the cam is left in the position indicated in said figure at all times that it is desired the refrigeration apparatus shall function automatically. When the cam is in the position referred to, the valve is under the influence of the thermostatic means. When it is desired to shut down the apparatus, whether for a relatively short time, as for defrosting purposes, or for a more protracted period, the cam 70 is turned to the position shown in Fig. 8. This has the effect of disposing the outer end of the sleeve 59 through which the valve is operated beyond the reach of the screw 60 that is carried by the lever 30. When it is desired to again set the apparatus in operation, the pilot light is turned on and ignited, and the cam is turned to the position shown in Fig. 7, which will elongate the connections between the valve body or disk and the outer end of the sleeve 59, causing the sleeve to abut the screw 60 while the valve stem, comprising the telescoping sections 56 and 57, is forced inwardly so as to unseat the valve through the action of the relatively stiff spring 58. This will supply gas to the main burner. The parts are held in the position stated until a circulation of liquid is induced through the inclined portions of the tubes 19 and 20 thereby to maintain the horizontal portion of the latter tube relatively cool with the result that the gas valve is held open by the thermostatic means. The cam 70 is adapted to be manipulated by the shaft 71 which, as previously explained, has a handle 72 at its forward end, access to which is gained by the removal of the closure 78.

Having thus described my invention, what I claim is:

1. Absorption refrigeration apparatus comprising a rigid stationary system of intercommunicating vessels and conduits, one of said vessels constituting the generator, means for heating the generator, and an automatic control therefor that is subject to the action of the liquid in the generator end of the system and is caused to function to render the heating means ineffective by reason of the liquid level in said end of the system falling below a predetermined elevation.

2. Absorption refrigeration apparatus comprising a rigid stationary system of intercommunicating vessels and conduits, one of said vessels constituting the generator, means for heating the generator, and an automatic control therefor that is subject to the action of the liquid in the generator end of the system and is caused to function to render the heating means ineffective by reason of the liquid level in said end of the system falling below a predetermined elevation and that is caused to act to render said heating means effective by the attainment of a predetermined low liquid level in the evaporator end of the system, such low liquid level in the evaporator end of the system resulting in said control being subjected to a predetermined high liquid level in the generator end of the system.

3. In absorption refrigeration apparatus, means for heating the generator, and a thermostatic control therefor in circulatory communication with the generator end of the system and whose temperature is so affected as to cause it to function to render the heating means ineffective by the attainment of a predetermined low liquid level in the generator end of the system.

4. In absorption refrigeration apparatus, means for heating the generator, and a thermostatic control therefor in circulatory communication with the generator end of the system and whose temperature is so affected as to cause it to function to render the heating means ineffective by the attainment of a predetermined low liquid level in said end of the system, and which is affected to cause it to act to render the heating means effective by the attainment of a predetermined low liquid level in the evaporator end of the system, such low liquid level in the evaporator end of the system resulting in said control being subjected to a predetermined high liquid level in the generator end of the system.

5. In absorption refrigeration apparatus, means for heating the generator, a thermostat for controlling the same which when heated or cooled in its entirety acts to render the heating means ineffective and when cooled in part only acts to render the heating means effective, means for administering heat to the thermostat, and further means responsive to the heat of the generator heating means for cooling the thermostat in part.

6. In absorption refrigeration apparatus, means for heating the generator, a thermostat for controlling the same which when heated or cooled in its entirety acts to render the heating means ineffective and when cooled in part only acts to render the heating means effective, means for administering heat to the thermostat, and communicative connections through which liquid from the refrigeration system is adapted to be brought into such relation to the thermostat as to cool the same in part, said connections being so disposed with respect to the generator heating means as to cause the heat therefrom to induce a flow of liquid from the system into said connections.

7. In absorption refrigeration apparatus, means for heating the generator, a thermostat for controlling the same which when heated or cooled in its entirety acts to render the heating means ineffective and when cooled in part only acts to render the heating means effective, means for administering heat to the thermostat, and communicative connections through which, when the liquid level in the generator is above a predetermined elevation, liquid is adapted to be circulated from the system in such relation to the thermostat as to cool the same in part, said connections being so disposed with respect to the generator heating means as to cause the heat therefrom to induce a circulation of liquid through said connections.

8. In absorption refrigeration apparatus, means for heating the generator, a thermostat for controlling the same which when heated or cooled in its entirety acts to render the heating means ineffective and when cooled in part only acts to render the heating means effective, means for administering heat to the thermostat, and communicative connections through which liquid in the refrigeration system serves to cool the thermostat in part during a certain phase in the cycle of operation of the apparatus.

9. In absorption refrigeration apparatus, means for heating the generator-absorber, a thermostat for controlling the same which when heated or cooled in its entirety acts to render the heating means ineffective and when cooled in part only acts to render the heating means effective, means for administering heat to the thermostat, communicative connections through which liquid in the generator-absorber end of the refrigeration system, so long as the liquid level in the generator is above a apredetermined elevation, serves to cool the thermostat in part, and further communicative connections through which liquid is displaced from the first mentioned connections by refrigerant gas returning from the evaporator end to the generator-absorber end of the system.

10. In absorption refrigeration apparatus, a fluid fuel combustion device for heating the generator, ignition means therefor, a thermostat for controlling the supply of fuel to said combustion device, said thermostat being subjected to the heat of the ignition means and serving when heated or cooled in its entirety to effect a shutting off of the fuel supply and when cooled in part only to effect a turning on of said supply, and communicative connections in heat receiving relation to the combustion device and through which a circulation of liquid from the refrigeration system is induced by heat from the combustion device during a certain phase of the cycle of operation of the apparatus for cooling the thermostat in part.

11. In absorption refrigeration apparatus, a fluid fuel combustion device for heating the generator, ignition means therefor, a thermostat for controlling the supply of fuel to said combustion device, said thermostat being subjected to the heat of the ignition means and serving when heated or cooled in its entirety to effect a shutting off of the fuel supply and when cooled in part only to effect a turning on of said supply, communicative connections through which liquid from the refrigeration system is adapted to be circulated when the liquid level in the generator is above a predetermined elevation, said connections being in heat receiving relation to the combustion device so that a circulation is induced through said connections when the combustion device is in operation, and further communicative connections through which liquid is displaced from the first mentioned connections by pressure within the system when the pressure in the evaporator end of the system is superior to that in the generator end.

12. In absorption refrigeration apparatus, means for heating the generator, a conduit in communication with the generator end of the system and through which liquid from the generator is capable of circulating so long as the liquid level in the generator is above a predetermined elevation, means for administering heat to a portion of said conduit, another portion of the conduit being in heat receiving relation to the generator heating means thereby to effect a circulation through the conduit, and thermostatic means rendered active by changes in temperature of the first mentioned portion of said conduit for controlling the generator heating means.

13. In absorption refrigeration apparatus, a fluid fuel combustion device for heating the generator, a conduit in communication with the generator end of the system through which liquid from the generator is capable of circulating so long as the liquid level in the generator is above a predetermined elevation, lighting means for the combustion device which is so situated as to administer heat to a portion of said conduit, another portion of the conduit being in heat receiving relation to said combustion device thereby to effect a circulation through the conduit, and thermostatic means rendered active by changes in temperature of the first mentioned portion of said conduit for controlling the supply of fuel to the combustion device.

14. In absorption refrigeration apparatus, a fluid fuel combustion device for heating the generator, a conduit having its receiving end communicating with the generator so as to receive overflow liquid therefrom when the liquid level is above said end and having its discharge end opening into the generator above the maximum liquid level therein, ignition means for lighting the combustion device and so arranged as to administer heat to a portion of said conduit, another portion of the conduit being in heat receiving relation to the combustion device thereby to effect a circulation through the conduit, and thermostatic means rendered active by changes in temperature of the first mentioned portion of said conduit for controlling the supply of fuel to the combustion device.

15. In absorption refrigeration apparatus, means for heating the generator-absorber, a conduit in communication with the generator-absorber end of the refrigeration system and through which liquid from the generator-absorber is capable of circulating so long as the liquid level in the generator-absorber is above a predetermined elevation, means for administering heat to the high portion of said conduit, an ascending portion of the conduit being in heat receiving relation to the first mentioned heating means thereby to effect a circulation through the conduit, thermostatic means rendered active by changes in temperature of the high portion of said conduit for controlling the generator-absorber heating means, and connections whereby liquid in said high portion is displaced by pressure incident to the return of refrigerant gas from the evaporator end of the system to the generator-absorber end thereof.

16. In absorption refrigeration apparatus comprising an intercommunicating system involving a generator-absorber and a receiver-evaporator, means for heating the generator-absorber, thermostatic means for controlling said heating means, said thermostatic means involving two thermosensitive elements which have to be of different temperatures in order to render the heating means effective, communicative connections through which liquid from the generator-absorber is adapted to flow when above a predetermined level therein for lowering the temperature of one of said thermosensitive elements, means for heating the thermosensitive elements, and other connections through which the pressure incident to the return of refrigerant gas from the receiver-evaporator to the generator-absorber displaces the liquid from the first mentioned connections so long as the pressure in the receiver-evaporator end of the system is superior to that in the generator-absorber end.

17. In absorption refrigeration apparatus comprising an intercommunicating system involving a generator-absorber and a receiver-evaporator, means for heating the generator-absorber, thermostatic means for controlling said heating means, said thermostatic means involving two thermosensitive elements which have to be of different temperatures, in order to render the heating means effective, a conduit communicating with the system and into which liquid from the generator-absorber is adapted to flow when above a predetermined level therein, a portion of said conduit constituting one of said thermosensitive elements, means for administering heat to said thermosensitive elements, and connections through which the pressure incident to the return of refrigerant gas from the receiver-evaporator to the generator-absorber displaces the liquid from the said portion of the conduit so long as the pressure in the receiver-evaporator end of the system is superior to that in the generator-absorber end.

18. In absorption refrigeration apparatus comprising an intercommunicating system involving a generator-absorber and a receiver-evaporator, a fluid fuel combustion device for heating the generator-absorber, thermostatic means for controlling the supply of fuel thereto, said thermostatic means involving two thermosensitive elements which have to be of different temperatures in order to effect the delivery of fuel to the combustion device, a conduit communicating with the system and into which liquid from the generator-absorber is adapted to flow when above a predetermined level therein, a part of said conduit constituting one of said thermosensitive elements, an igniter for lighting the combustion device and arranged to administer heat to said thermosensitive elements, and connections through which the pressure incident to the return of refrigerant gas from the receiver-evaporator to the generator-absorber displaces the liquid from the aforesaid part of said conduit so long as the pressure in the receiver-evaporator end of the system is superior to that in the generator-absorber end.

19. In absorption refrigeration apparatus, means for heating the generator-absorber, a conduit arranged to receive overflow liquid from the generator-absorber when the liquid level therein is above a predetermined elevation and which discharges into the generator-absorber, thermostatic means rendered active by changes in temperature of an intermediate portion of said conduit for controlling the aforesaid heating means, a gas return conduit leading from the receiver-evaporator to the generator-absorber, and a branch conduit leading therefrom to the first mentioned conduit for clearing the said intermediate portion of liquid during the cooling phase of the cycle of operation of the apparatus.

20. In absorption refrigeration apparatus, means for heating the generator-absorber, a conduit arranged to receive overflow liquid from the generator-absorber when the liquid level therein is above a predetermined elevation and which discharges into the generator-absorber, thermostatic means incorporating an intermediate portion of said conduit for controlling the aforesaid heating means, a gas return conduit leading from the receiver-evaporator to the generator-absorber, and a branch conduit leading therefrom to the first mentioned conduit for clearing the said intermediate portion of liquid during the cooling phase of the cycle of operation of the apparatus.

21. In absorption refrigeration apparatus, means for heating the generator-absorber, a conduit arranged to receive overflow liquid from the generator-absorber when the liquid level therein is above a predetermined elevation and to discharge liquid into the generator-absorber above the maximum liquid level therein, a portion of said conduit being in heat receiving relation to the aforesaid heating means whereby a circulation is produced through said conduit, thermostatic means rendered active by changes in temperature of a second portion of said conduit for controlling the heating means, an auxiliary heater for imparting heat to said second portion of the conduit, and a gas return conduit leading from the receiver-evaporator to the generator-absorber and communicating with the aforesaid conduit for clearing the said second portion of liquid during the evaporation period.

22. In absorption refrigeration apparatus, means for heating the generator-absorber, a conduit arranged to receive overflow liquid from the generator-absorber when the liquid level therein is above a predetermined elevation and to discharge liquid into the generator-absorber, thermostatic means for controlling the aforesaid heating means and incorporating an intermediate portion of said conduit, an auxiliary heater for imparting heat to said intermediate portion, another portion of the conduit being in heat receiving relation to the aforesaid heating means thereby to effect a circulation through the conduit, and a gas return conduit leading from the receiver-evaporator to the generator-absorber and having a branch communicating with the aforesaid conduit for clearing the said intermediate portion thereof of liquid during the evaporation period.

23. In absorption refrigeration apparatus, a combustion device for heating the generator-absorber, a conduit having its receiving end arranged to receive overflow liquid from the generator-absorber when the liquid level therein is above a predetermined elevation and having its discharge end arranged to deliver liquid to the generator-absorber, thermostatic means for controlling the combustion device, the same being rendered active by changes in temperature of an intermediate portion of the aforesaid conduit, a pilot burner for lighting the combustion device and arranged in heating relation to said intermediate portion of the aforesaid conduit, and a gas return conduit leading from the receiver-evaporator to the generator-absorber and communicating with the aforesaid conduit for clearing said intermediate portion of liquid during the cooling period.

24. In absorption refrigeration apparatus, a combustion device for heating the generator-absorber, a conduit having its receiving end arranged to receive overflow liquid from the generator-absorber when the liquid level therein is above a predetermined elevation and having its discharge end arranged to deliver liquid to the generator-absorber, an ascending portion of said conduit being in heat receiving relation to said combustion device, thermostatic means for controlling the combustion device and incorporating an intermediate portion of the aforesaid conduit, a pilot burner for lighting the combustion device and arranged in heating relation to said intermediate portion of the aforesaid conduit, and a gas return conduit leading from the receiver-evaporator to the generator-absorber and having a branch communicating with the aforesaid conduit for clearing said intermediate portion of liquid during the evaporation period.

25. In absorption refrigeration apparatus, a combustion device for heating the generator-absorber, ignition means for lighting the combustion device, a conduit in part in heat receiving relation to the combustion device and communicating with the generator-absorber and through which liquid from the generator-absorber is adapted to be circulated when the liquid level in the generator-absorber is above a predetermined elevation and the combustion device is in operation, means for controlling the supply of fuel to the combustion device, a thermostat for actuating the same comprising thermosensitive elements one of which is rendered active by changes in temperature of the contents of a portion of the aforesaid conduit, said thermosensitive elements being arranged to receive heat from the ignition means, and a gas return conduit leading from the receiver-evaporator to the generator-absorber and communicating with the first mentioned conduit thereby to clear the aforesaid portion of liquid during the evaportion period.

26. In absorption refrigeration apparatus, a combustion device for heating the generator-absorber, ignition means for lighting the combustion device, a conduit communicating with the generator-absorber and through which liquid from the generator-absorber is adapted to be circulated when the liquid level in the generator-absorber is above a predetermined elevation, a part of said conduit being arranged to receive heat from the combustion device, means for controlling the supply of fuel to the combustion device, a thermostat for actuating the same comprising a portion of the aforesaid conduit and an elongated thermosensitive element in juxtaposition therewith, said portion of the conduit being fixed at one end against movement and at the other against movement with respect to the thermosensitive element, said portion of the conduit and said element being arranged to receive heat from the ignition means, and a gas return conduit leading from the receiver-evaporator to the generator-absorber and having a branch communicating with the first mentioned conduit thereby to clear the portion adjacent the thermosensitive element of liquid during the evaporation period.

27. In refrigeration apparatus of the intermittent absorption class, means for heating the generator, auxiliary heating means, thermostatic means for controlling the operation of the first mentioned heating means comprising two thermosensitive elements that are subjected to the heat of the auxiliary heating means, the thermostatic means functioning to render the first mentioned heating means ineffective when both thermosensitive elements are heated to a predetermined degree by the auxiliary heating means, said thermostatic means operating to render the first mentioned heating means effective when one thermosensitve element is heated to the aforesaid degree and the other is at a predetermined lower temperature, the said other element being arranged for subjection to the temperature of the contents of the generator end of the refrigeration system, and connections whereby a certain liquid level condition in the system governs the subjection of said other thermosensitive element to said temperature.

28. In refrigeration apparatus of the intermittent absorption class, means for heating the generator, auxiliary heating means, thermostatic means for controlling the operation of the first mentioned heating means comprising two thermosensitive elements that are subjected to the heat of the auxiliary heating means, the thermostatic means functioning to render the first mentioned heating means ineffective when both thermosensitive elements are heated to a predetermined degree by the auxiliary heating means, said thermostatic means operating to render the first mentioned heating means effective when one thermosensitive element is heated to the aforesaid degree and the other is at a predetermined lower temperature, the said other element being arranged for subjection to the temperature of the contents of the generator end of the refrigeration system, and connections whereby the liquid level in the evaporator end of the system governs the subjection of said other thermosensitive element to said temperature.

29. In refrigeration apparatus of the intermittent absorption class, a combustion device for heating the generator, a valve for governing the supply of fuel thereto, a pilot light for igniting the combustion device, thermostatic means for controlling said valve comprising two thermosensitive elements that are subjected to the heat of the pilot light, the thermostatic means functioning to effect the closing of the valve when both elements are heated to a predetermined degree by the pilot light, said thermostatic means operating to effect the opening of the valve when one element is heated to the aforesaid degree and the other is at a predetermined lower temperature, the said other element being arranged for subjection to the temperature of the contents of the generator end of the refrigeration system, and connections whereby the liquid level in the evaporator end of the system governs the subjection of said other thermosensitive element to said temperature.

30. In refrigeration apparatus of the intermittent absorption class, means for heating the generator-absorber, auxiliary heating means, thermostatic means for controlling the operation of the first mentioned heating means comprising two thermosensitive elements that are subjected to the heat of the auxiliary heating means, the thermostatic means functioning to render the first mentioned heating means ineffective when both thermosensitive elements are heated to a predetermined degree by the auxiliary heating means and operating to render the first mentioned heating means effective when one thermosensitive element is heated to the aforesaid degree and the other is at a predetermined lower temperature, the said other element being arranged for subjection to the temperature of the contents of the generator-absorber end of the refrigeration system, and connections whereby the pressure conditions in the system govern the subjection of said thermosensitive element to said temperature.

31. In refrigeration apparatus of the intermittent absorption class, a combustion device for heating the generator, a valve for governing the supply of fuel thereto, a pilot light for igniting the combustion device, thermostatic means for controlling said valve comprising two thermosensitive elements that are subjected to the heat of the pilot light, the thermostatic means functioning to effect the opening of the valve when both elements are heated to a predetermined degree by the pilot light and operating to effect the closing of the valve when one element is heated to the aforesaid degree and the other is at a predetermined lower temperature, the said other element being arranged for subjection to the temperature of the contents of the generator end of the refrigeration system, and connections whereby the pressure conditions in the system and the heat from the combustion device govern the subjection of said other thermosensitive element to said temperature.

32. In absorption refrigeration apparatus, a fluid fuel combustion device for heating the generator, ignition means therefor, a thermostat for controlling the supply of fuel to said combustion device, said thermostat being subjected to the heat of the ignition means and serving when heated or cooled in its entirety to effect a shutting off of the fuel supply and when cooled in part only to effect a turning on of said supply, and communicative connections in heat receiving relation to the combustion device and through which a circulation of liquid from the refrigeration system is induced by heat from the combustion device during a certain phase of the cycle of operation of the apparatus for cooling the thermostat in part, the parts being so arranged that heat from the combustion device augments that of the ignition means in heating the thermostat during the heating period of a cycle of operation of the apparatus.

33. In refrigeration apparatus of the intermittent absorption class, means for heating the generator, auxiliary heating means, and thermostatic means for controlling the operation of the first mentioned heating means comprising two thermosensitive elements that are subjected to the heat of the auxiliary heating means, the thermostatic means functioning to render the first mentioned heating means ineffective when both thermosensitive elements are heated to a predetermined degree by the auxiliary heating means, said thermostatic means operating to render the first mentioned heating means effective when one thermosensitive element is heated to the aforesaid degree and the other is at a predetermined lower temperature, the said other element being arranged for subjection to the temperature of the contents of the generator end of the refrigeration system, the generator heating means augmenting the auxiliary heating means in imparting heat to the thermosensitive elements during the heating period of a cycle of operation of the apparatus.

34. In absorption refrigeration apparatus, a generator, means for heating the generator, and a thermostat for controlling the same, said thermostat comprising two elements one of which is hollow and is arranged to receive part of the contents of the refrigeration apparatus and have its temperature changed thereby in relation to the temperature of the other element.

35. In absorption refrigeration apparatus, a generator, a combustion device for heating the generator, an igniter for lighting the combustion device, a thermostat for controlling the combustion device composed of two elements both exposed to heat from the igniter, means through which liquid from the generator end of the system is adapted to be circulated in heat exchanging relation to one of the elements of the thermostat and so arranged that heat from the combustion device will cause a circulation of liquid through said means, the heat from the igniter serving to drive out the liquid from said means and create therein a gas pocket when the combustion device is ineffective to cause a circulation through said means.

36. In absorption refrigeration apparatus, a combustion device for heating the generator, a pilot light for igniting the same, a thermostatic control for the combustion device comprising two elements one of which is constantly heated by the pilot light, the second being heated by the pilot light during part of the cycle and cooled by the liquid in the refrigeration system during another part of the cycle, the cooling action of the liquid on the second element being initiated by a rise in pressure in the generator end of the system as compared with that in the evaporator end, and means whereby the combustion device is rendered effective when the second element is at a lower temperature than the first.

37. In absorption refrigeration apparatus, a combustion device for heating the generator, a pilot light therefor, a thermostatic control for said device comprising two thermosensitive elements one of which is constantly heated by the pilot light, the second being heated by the pilot light during part of the cycle and cooled by the liquid in the refrigeration system during another part of the cycle and means whereby the combustion device is rendered effective when the second element is at a lower temperature than the first.

38. In absorption refrigeration apparatus, a combustion device for heating the generator, a pilot light therefor, a thermostatic control for said device comprising two thermosensitive elements one of which is constantly heated by the pilot light, the second being heated by the pilot light during part of the cycle and cooled by the liquid in the refrigeration system during that part of the cycle in which the pressure in the generator is greater than the pressure in the evaporator, the cooling action ceasing when the pressure in the generator becomes equal to or less than the pressure in the evaporator.

39. In absorption refrigeration apparatus, a generator, means for heating the generator, a thermostat for controlling the heating means, said thermostat being composed of two elements which, when at substantially the same temperature, or a certain one is lower in temperature than the other, render the heating means ineffective and when the said certain one is higher in temperature than the other, render the heating means effective.

40. In absorption refrigeration apparatus, a generator, a combustion device for heating the generator, ignition means therefor, and a thermostat for controlling the combustion device, said thermostat being composed of two elements that are subjected to the heat of both the ignition means and combustion device, one of said elements being also subjected to the temperature of the liquid contents of the generator, the thermostat serving when both elements are at substantially the same temperature to render the combustion device ineffective, and when at different temperatures, to render the same effective.

WILBUR G. MIDNIGHT.